United States Patent
Hamman et al.

(10) Patent No.: US 7,892,087 B1
(45) Date of Patent: Feb. 22, 2011

(54) AUTHENTICATION OF GAME RESULTS

(75) Inventors: Robert D. Hamman, Dallas, TX (US); Kenneth R. Westerlage, Fort Worth, TX (US); William C. Kennedy, III, Dallas, TX (US)

(73) Assignee: SCA Promotions, Inc., Dallas, TX (US)

( * ) Notice: Subject to any disclaimer, the term of this patent is extended or adjusted under 35 U.S.C. 154(b) by 1078 days.

(21) Appl. No.: 10/308,603

(22) Filed: Dec. 2, 2002

(51) Int. Cl. *A63F 9/24* (2006.01)
(52) U.S. Cl. .......................................... 463/22; 463/29
(58) Field of Classification Search .................... 463/1, 463/16, 22, 25, 29, 40–43; 380/1, 2, 251, 380/255, 258, 259, 264, 59, 265, 277–279, 380/44–46, 18–33, 282
See application file for complete search history.

(56) References Cited

U.S. PATENT DOCUMENTS

| | | | |
|---|---|---|---|
| 4,157,829 A | 6/1979 | Goldman et al. | 273/138 A |
| 4,527,798 A | 7/1985 | Siekierski et al. | 273/361 |
| 4,832,341 A | 5/1989 | Muller et al. | 273/139 |
| 5,042,809 A | 8/1991 | Richardson | 273/138 A |
| 5,282,620 A | 2/1994 | Keesee | 273/138 A |
| 5,286,023 A | 2/1994 | Wood | 273/138 A |
| 5,380,007 A | 1/1995 | Travis et al. | 273/138 A |
| 5,398,932 A | 3/1995 | Eberhardt et al. | 273/138 A |
| 5,407,199 A * | 4/1995 | Gumina | 273/139 |
| 5,456,465 A | 10/1995 | Durham | 273/138 A |
| 5,505,449 A | 4/1996 | Eberhardt et al. | 273/138 A |
| 5,507,489 A | 4/1996 | Reibel et al. | 273/138 A |
| 5,524,035 A | 6/1996 | Casal et al. | 377/47 |
| 5,551,692 A | 9/1996 | Pettit et al. | 273/143 R |
| 5,569,082 A | 10/1996 | Kaye | 463/17 |
| 5,674,128 A | 10/1997 | Holch et al. | 463/42 |
| 5,709,603 A | 1/1998 | Kaye | 463/17 |
| 5,797,794 A | 8/1998 | Angell | 463/18 |
| 5,800,269 A | 9/1998 | Holch et al. | 463/42 |
| 5,855,369 A | 1/1999 | Lieberman | 273/139 |
| 5,879,234 A | 3/1999 | Mengual | 463/20 |
| 5,938,200 A | 8/1999 | Markowicz et al. | 273/246 |
| 5,970,143 A * | 10/1999 | Schneier et al. | 713/181 |
| 6,017,032 A * | 1/2000 | Grippo et al. | 273/138.1 |
| 6,030,288 A | 2/2000 | Davis et al. | 463/29 |
| 6,033,308 A | 3/2000 | Orford et al. | 463/28 |
| 6,044,135 A | 3/2000 | Katz | 379/93.13 |
| 6,080,062 A | 6/2000 | Olson | 463/42 |
| 6,089,982 A | 7/2000 | Holch et al. | 463/42 |
| 6,099,408 A * | 8/2000 | Schneier et al. | 463/29 |
| 6,146,272 A | 11/2000 | Walker et al. | 463/17 |
| 6,165,072 A | 12/2000 | Davis et al. | 463/29 |
| 6,168,521 B1 | 1/2001 | Luciano et al. | 463/18 |
| 6,183,361 B1 | 2/2001 | Cummings et al. | 463/18 |
| 6,264,557 B1 | 7/2001 | Schneier et al. | 463/29 |
| 6,264,561 B1 * | 7/2001 | Saffari et al. | 463/42 |
| 6,277,026 B1 | 8/2001 | Archer | 463/42 |

(Continued)

*Primary Examiner*—Pierre E Elisca
(74) *Attorney, Agent, or Firm*—Baker Botts L.L.P.

(57) ABSTRACT

A gaming system includes a game server and a client server. The client server requests random numeric outcomes from the game server and supplies various state and game information. The game server generates one or more random numeric outcomes. The game server communicates the random numeric outcomes to the client server to be used in making a win determination. For purposes of future authentication, the game server stores a digitally-signed file that includes the random numeric outcomes and the state and game information.

9 Claims, 4 Drawing Sheets

U.S. PATENT DOCUMENTS

| | | | | |
|---|---|---|---|---|
| 6,280,325 B1 * | 8/2001 | Fisk | | 463/19 |
| 6,280,328 B1 | 8/2001 | Holch et al. | | 463/42 |
| 6,322,446 B1 | 11/2001 | Yacenda | | 463/16 |
| 6,325,716 B1 | 12/2001 | Walker et al. | | 463/17 |
| 6,331,143 B1 | 12/2001 | Yoseloff | | 463/18 |
| 6,585,590 B2 * | 7/2003 | Malone | | 463/19 |
| 6,595,856 B1 * | 7/2003 | Ginsburg et al. | | 463/29 |
| 6,804,782 B1 * | 10/2004 | Qiu et al. | | 713/194 |
| 2001/0003098 A1 | 6/2001 | Moody | | 463/17 |
| 2001/0003100 A1 | 6/2001 | Yacenda | | 463/41 |
| 2001/0036853 A1 | 11/2001 | Thomas | | 463/17 |
| 2001/0046891 A1 | 11/2001 | Acres | | 463/18 |
| 2002/0002076 A1 | 1/2002 | Schneier et al. | | 463/29 |
| 2002/0006821 A1 | 1/2002 | Park | | 463/17 |
| 2002/0010015 A1 | 1/2002 | Acres | | 463/18 |
| 2002/0016913 A1 * | 2/2002 | Wheeler et al. | | 713/170 |
| 2002/0049909 A1 * | 4/2002 | Jackson et al. | | 713/188 |
| 2002/0071557 A1 * | 6/2002 | Nguyen | | 380/251 |

\* cited by examiner

AUTHENTICATION OF GAME RESULTS

TECHNICAL FIELD OF THE INVENTION

This invention relates in general to games of chance, and more particularly to a gaming system that provides for authentication of generated results.

BACKGROUND OF THE INVENTION

The gaming industry has enjoyed a substantial increase in popularity over the last decade. This increased popularity has produced an extremely competitive market for game operators.

Despite the increasingly competitive nature of the industry, a game operator responsible for paying out prizes may be unwilling to rely on innovations developed by others if the game operator lacks the expertise to understand the technology, its potential for error, and how it will impact the game operator's prize obligations. Therefore, to facilitate the introduction and acceptance of innovations into this competitive market, a system is desired that will shift responsibility for prize disbursement to a game sponsor, typically the innovator, who is more knowledgeable about the operation of the innovation and more capable of predicting and preventing its malfunction.

However, a system in which the game operator conducts the game but the game sponsor is responsible for paying winners will encourage fraud by game operators who can alter game situations to generate excessive winners. Additionally, game sponsors may not want to be burdened with the details of operating the game on their own. Consequently, a method is desired for operating a game in which a game sponsor can agree to reimburse the game operator for all prizes disbursed, but be assured that the game operator will not fraudulently generate winners.

Additionally, game operators may choose to conduct a wide range of games. Thus, to prevent continual re-design, a system is desired that allows a game sponsor to generate random results for a wide variety of different games conducted by multiple operators.

SUMMARY OF THE INVENTION

In accordance with the present invention, the disadvantages and problems associated with a gaming system have been substantially reduced or eliminated. In particular, the invention provides a method and system for providing random numeric outcomes to be used in determining whether a win has occurred in a game of chance, the method and system being both flexible and fraudproof.

In accordance with one embodiment of the present invention, a method for providing numeric outcomes to a game operator comprises receiving a request that includes a game type of a game, game parameters, and commit data describing the game; generating one or more random numeric outcomes using the request; storing the commit data and the random numeric outcomes in an audit log; and communicating the random numeric outcomes to a game operator to be used by the game operator to determine whether a win has occurred.

In accordance with another embodiment of the present invention, a method of authenticating a win result for a game of chance comprises receiving a claim regarding a win result in a game; retrieving an entry from an audit log, the entry comprising one or more random numeric outcomes and commit data associated with the game; verifying that the random numeric outcomes were generated properly; and using the commit data to verify that the random numeric outcomes in the entry results in the win result.

Important technical advantages of certain embodiments of the present invention include the ability to authenticate win determinations made on the basis of random numeric outcomes. Other important technical advantages of certain embodiments of the present invention include providing random numbers for a plurality of game operators and game devices, producing outcomes for a variety of games, and updating a signature key to provide a verifiable signature.

Additional technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
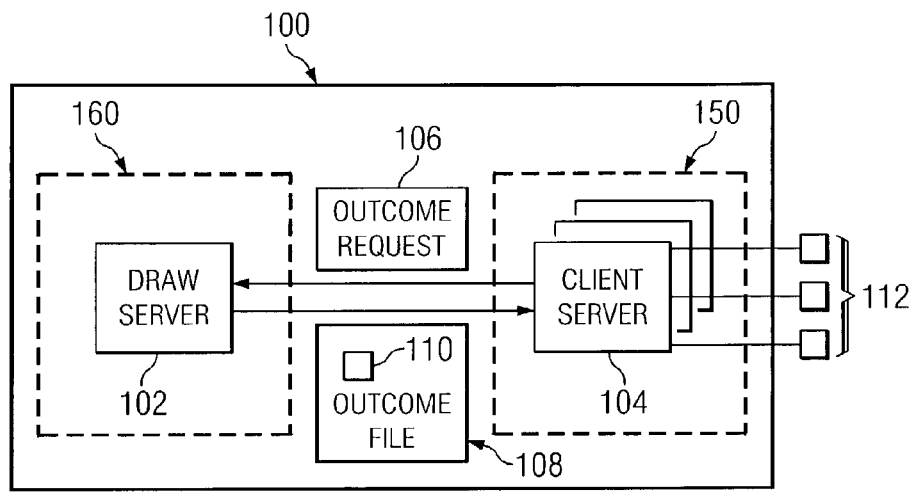
FIG. 1 illustrates a system which includes a draw server, a client server, and at least one player.

FIG. 1 illustrates a gaming system 100 for playing a game of chance that includes a draw server 102, a client server 104, and players 112. Draw server 102 couples to client server 104. Client server 104 is in communication with players 112. Gaming system 100 can be adapted to generate one or more random numeric outcomes 110 to be used in making a win determination for a wide range of games including, but not limited to bingo, keno, and a variety of number-guessing games.

Draw server 102 and client server 104 can be general purpose computers, dedicated microprocessors, or other processing devices capable of communicating electronic information. Examples of draw server 102 and client server 104 include application-specific integrated circuits (ASICs), field-programmable gate arrays (FPGAs), digital signal processors (DSPs) and any other suitable specific or general purpose processors.

While FIG. 1 illustrates an embodiment of gaming system 100 including one client server 104, gaming system 100 may include any number of client servers 104. Draw server 102 may generate random numeric outcomes 110 for games conducted by multiple client servers 104.

Draw server 102 may couple to client server 104 in various ways. In a particular embodiment, draw server 102 and client server 104 are physically separated and draw server 102 couples to client server 104 using an Internet connection. In another embodiment, draw server 102 and client server 104 represent devices located in the same computer and draw server 102 couples to client server 104 directly. In general, draw server 102, client server 104, and players 112 may communicate using any combination of public or private communications equipment such as elements of a public switched telephone network (PSTN), a global computer network such as the Internet, a local area network (LAN), a wide area network (WAN), or other appropriate wireline or wireless communications equipment.

Client server 104 may conduct the game in real-time interacting with players 112 simultaneously, or interact with them individually over a period of time. Players 112 may interact with client server 104 locally, such as through a keyboard connected directly to client server 104, or remotely, such as through another computer that establishes a network connection with client server 104. Gaming system 100 can be adapted to conduct a game involving any number of players.

Numerous entities may control or operate the elements of gaming system 100 and the entities may use a variety of different configurations to distribute the elements among themselves. In a particular embodiment, a game sponsor 150 and a game operator 160 operate or control draw server 102 and client server, 104 respectively. Game sponsor 150 is a person, group of people, or entity responsible for disbursing prizes won in games conducted on gaming system 100 or for reimbursing others who disburse prizes. Game operator 160 is a person, group of people, or entity responsible for determining the winners of games conducted on gaming system 100.

In operation, client server 104 conducts a game for players 112. Client server 104 requests one or more random numeric outcomes 110 from draw server 102 by communicating to draw server 102 an outcome request 106. Outcome request 106 includes game information that both indicates the type of outcome requested from draw server 102 and describes the state of the game for which client server 104 requests random numeric outcomes 110.

For some types of games, players 112 may submit input before draw server 102 generates random numeric outcome 110. For example, in a game of keno, players 112 may choose numbers upon which to wager before a random numeric outcome 110 can be requested from draw server 102. Other games may not include input from players 112. For example, a bingo game can proceed with no input from players as the outcome is strictly a result of the balls called and the bingo cards in play. For games with player input, the state information in outcome request 106 includes player input.

Draw server 102 receives outcome request 106 and, based on the game information in outcome request 106, generates one or more random numeric outcomes 110. Draw server 102 creates an outcome file 108 containing the random numeric outcomes 110 and digitally signs outcome file 108. Draw server 102 stores a copy of outcome file 108 and communicates outcome file 108 to client server 104.

Client server 104 then uses random numeric outcomes 110 in outcome file 108 to generate a win determination based on the rules of the game and the state. For example, if the game is bingo, client server converts random numeric outcomes 110 in outcome request 108 into bingo balls and determines whether a win has occurred based on the bingo cards that are currently being played. For a keno game, client server 104 compares random numeric outcomes 110 to the numbers players 112 bet to determine if a win occurred.

Figure 2:
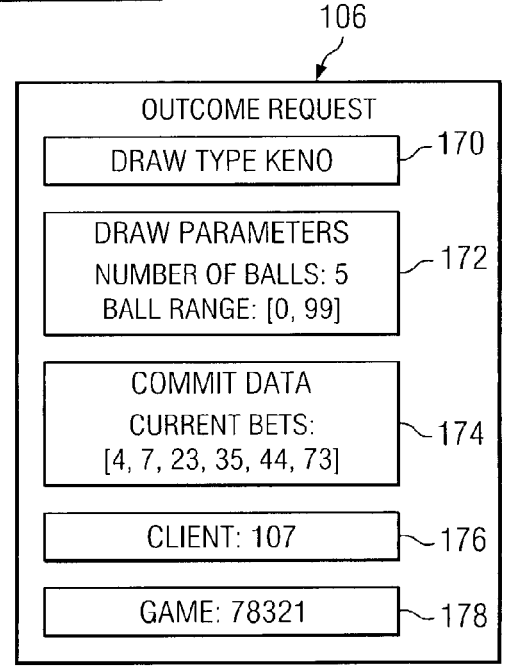
FIG. 2 illustrates an outcome request according to one embodiment of the present invention.

FIG. 2 illustrates further details of the contents of outcome request 106. Outcome request 106 contains draw information that affects the generation of random numeric outcomes 110 by draw server 102 and game information that describes both the current state of the game being conducted and how client server 104 will use random numeric outcomes 110 to make a win determination. Outcome request 106 can be an electronic file, an electronic message or any other transferable collection of information. Furthermore, although FIG. 2 illustrates an outcome request 106 containing textual information, outcome request may contain information in any format readable by draw server 102.

In a particular embodiment, this information includes a draw type indicator 170, draw parameters 172, and commit data 174. However, in other embodiments, any or all of this information can be agreed to contractually at the beginning of game operation and need not be included in outcome request 106.

Additionally, if draw server 102 communicates with a number of client servers 104, outcome request 106 may include information identifying the particular client server 104 that issued the request, a client identifier 176, and/or information identifying the particular game for which the client server 104 made the request, a game identifier 178. Draw server 102 may use client identifier 176 to determine the particular client server 104 to send outcome file 108. Draw server 102 may include game identifier 178 in outcome file 108 and client server 104 may then use game identifier 178 to determine the particular game for which the random numeric outcomes 110 in outcome file 108 were generated.

Draw type indicator 170 specifies the general type of game for which client server 104 requests random numeric outcomes 110. For example, if a particular draw server 102 supports bingo, keno, slot-machine, and number-guessing games, draw type indicator 170 specifies which of these types of games client server 104 is conducting.

Draw parameters 172 give specific information about the draw being requested and may vary depending on the type of game client server 104 conducts. For a keno game, this information may include the number of numbers to be generated. For a bingo game, this information may include the number of balls to be drawn and the range of numbers available. For a slot-machine game, this may include the number of reels being used and the number of variations available on each.

Commit data 174 includes various additional information that defines the current state of the game being conducted by client server 104 and indicates how client server 104 will use random numeric outcomes 110 to make a win determination. The content of this information will vary depending on the characteristics of the particular gaming system 100, the requirements of the game being conducted, and the information game sponsor 150 and game operator 160 have agreed upon contractually.

For example, for a slot machine game, commit data 174 may include information indicating how client server 104 will convert the random numeric outcomes 110 into a slot symbol and what combination of symbols are considered to be a winning result. For a keno game, commit data 174 may include information indicating what numbers players 112 selected. For a bingo game, commit data 174 might include information indicating what cards are currently in play. This information may be a copy of the bingo cards currently being played or card numbers referencing cards game operator 160 and game sponsor 150 have defined contractually. Similarly, commit data 174 may indicate whether the game being played is a basic bingo game or a "blackout" game requiring that all the squares on the card be covered.

Although this information may not be necessary to generate the requested draw, gaming system 100 prevents fraudulent claims by requiring game operator 160 to commit to this information before draw server 102 generates random numeric outcomes 110. Absent commit data 174, game operator 160 could redefine the rules or state of the game after receiving random numeric outcomes 110 and generate fraudulent wins. For example, in a bingo game, if game operator 160 were not required to commit to the specific bingo cards currently being played, game operator 160 could simply claim the bingo cards in play included a card that would produce a winner based on random numeric outcomes 110.

The specific outcome request 106 illustrated in FIG. 2 applies to a keno game in a particular embodiment. Draw type indicator 170 indicates that client server 104 requests a keno draw. Draw parameters 172 indicate that client server 104 needs five balls and that the valid range includes any number from "0" to "99". Commit data 174 indicates that players 112 have bet on the numbers "4", "7", "23", "35", "44", and "73".

Figure 3:
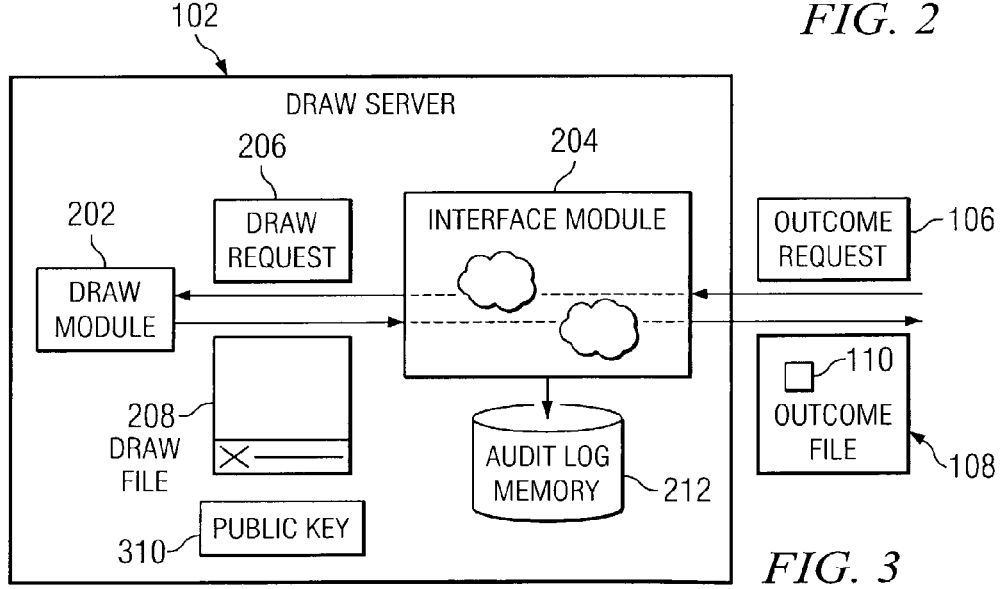
FIG. 3 is a block diagram illustrating the contents and operation of a draw server.

FIG. 3 is a block diagram illustrating exemplary components of draw server 102. Draw server 102 comprises a draw module 202, an interface module 204, and an audit log memory 212.

Interface module 204 facilitates communication between draw module 202 and client server 104. Additionally, interface module 204 stores a draw file 208 created by draw module 202 in audit log memory 212 to preserve draw file 208 for future authentication.

Draw module 202 generates one or more random numeric outcomes 110 in response to outcome request 106 from client server 104, and returns draw file 208 containing random numeric outcomes 110 and commit data 174. Additionally, draw module 202 digitally signs draw file 208 to allow for future authentication.

Interface module 204 and draw module 202 may comprise logic encoded in media for carrying out functions of the system. The logic comprises functional instructions for carrying out programmed tasks. The media comprises computer disks or other suitable computer-readable media, application-specific integrated circuits (ASICs), field-programmable gate arrays (FPGAs), digital signal processors (DSPs) or other suitable specific or general purpose processors, transmission media or other suitable media in which logic may be encoded and utilized.

In one embodiment, draw module 202 comprises a dedicated processor such as an IBM "4758" PCI Cryptographic Coprocessor. The "4758" is a PCI computer board for use in secure network communications and can be installed in most PCs. The "4758" generates random numbers based on an extremely sensitive reading of the temperature inside the "4758". After generating random numbers, the "4758" digitally signs the results using a 1024-bit private key in accordance with Federal Information Processing Standard 186 "Digital Signature Standard".

Audit log memory 212 is a memory device for storing digitally-signed draw files 208 communicated from draw module 202. Audit log memory 212 can comprise any collection and arrangement of volatile or non-volatile, local or remote devices suitable for storing data, for example, random access memory (RAM) devices, read only memory (ROM) devices, magnetic storage devices, optical storage devices, or any other suitable data storage devices.

In operation, interface module 204 receives outcome request 106 from client server 104. In response, interface module 204 communicates a draw request 206 to draw module 202. Draw request 206 contains information included in outcome request 106. Additionally, if outcome request 106 includes client identifier 176 or game identifier 178, draw request 206 may or may not include either or both of these depending on the requirements of gaming system 100.

Depending on the requirements of the particular client server 104 and draw module 202, interface module 204 may format outcome request 106 to produce draw request 206. By doing so, interface module 204 may make it feasible to use otherwise incompatible components for client server 104 and draw module 204, or to include a variety of different types of client servers 104 in gaming system 100. However, in a particular embodiment, interface module 204 may not need to do any formatting and draw request 206 may be identical to outcome request 106.

In response to draw request 206, draw module 202 generates the requested random numeric outcomes 110. Draw module 202 creates a draw file 208 that is digitally signed and communicates draw file 208 to interface module 204. Interface module 204 stores a copy of draw file 208 in audit log memory 212, which may be used for future authentication.

Interface module 204 then communicates outcome file 108 to client server 104. Outcome file 108 includes information contained in draw file 208. Outcome file 108 may or may not be digitally signed. As with outcome request 106 and draw request 206, interface module 204 may format draw file 208 to create outcome file 108 depending on the requirements of draw module 202 and client server 104. However, in a particular embodiment, outcome file 108 is identical to draw file 208.

Figure 4:
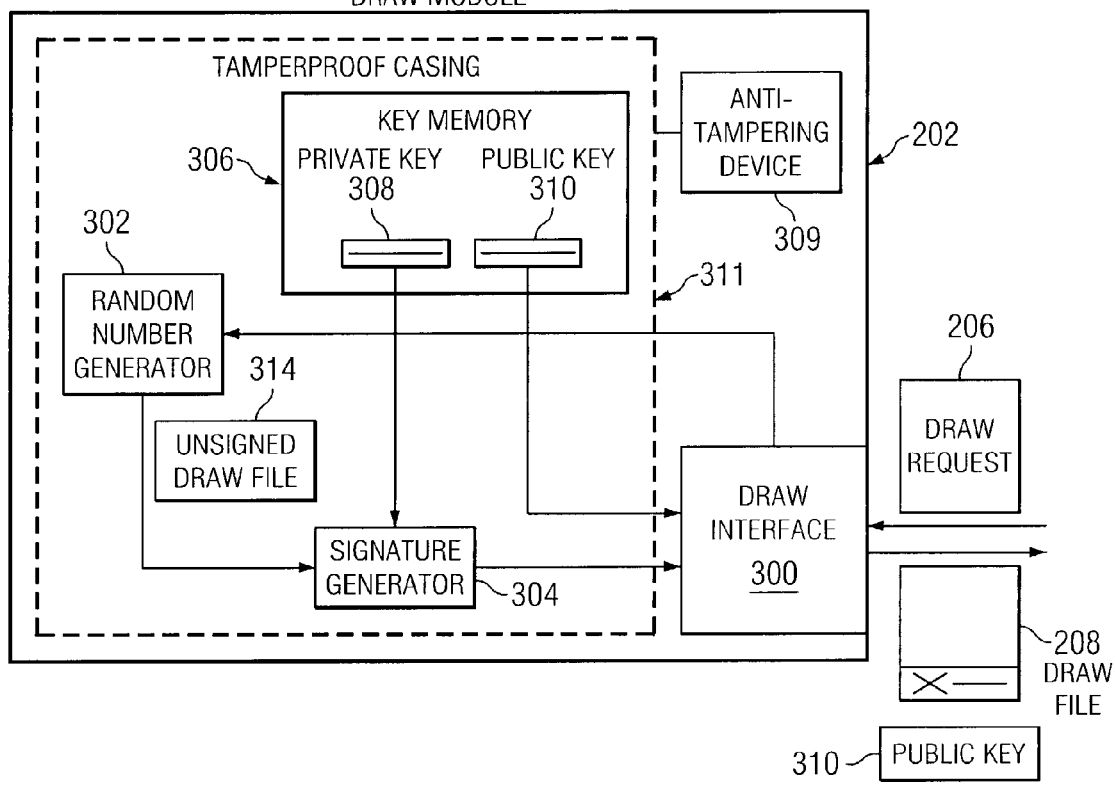
FIG. 4 is a diagram illustrating operation of a draw module in producing an outcome from a request.

FIG. 4 is a block diagram illustrating exemplary components of draw module 202. Draw module 202 comprises a draw interface 300, a random number generator 302, a signature generator 304, a key memory 306, and an anti-tampering device 309. Draw module 202 is enclosed in a tamperproof casing 311.

Draw interface 300 receives draw request 206 from interface module 204 and communicates draw request 206 to random number generator 302. Random number generator 302 generates one or more random numeric outcomes 110 based on draw type indicator 170 and draw parameters 172 in draw request 206.

Random number generator 302 generates an unsigned draw file 314 which includes random numeric outcomes 110 and commit data 174. Commit data 174 is included in unsigned draw file 314 to ensure that commit data 174 is preserved for later authentication. Additionally, if draw request 106 included client identifier 176 or game identifier 178, either or both may be included in unsigned draw file 314. Random number generator 302 communicates unsigned draw file 314 to signature generator 304.

Signature generator 304 receives unsigned draw file 314 from random number generator 302. Signature generator 304 reads a private key 308 from key memory 306. Signature generator 304 uses private key 308 to digitally sign unsigned draw file 314 to generate draw file 208 with a digital signature 312. Draw interface 300 communicates draw file 208 to draw interface 300.

Draw interface 300, random number generator 302 and signature generator 304 may comprise logic encoded in media for carrying out functions of the system. The logic comprises functional instructions for carrying out programmed tasks. The media comprises computer disks or other suitable computer-readable media, application-specific integrated circuits (ASICs), field-programmable gate arrays (FPGAs), digital signal processors (DSPs) or other suitable specific or general purpose processors, transmission media or other suitable media in which logic may be encoded and utilized.

Key memory 306 holds private key 308 and a public key 310. Private key 308 and public key 310 are a cryptographic key-pair generated by signature generator 304 to sign and authenticate draw files 208 using conventional techniques for digital signatures. Signature generator 304 uses private key 308 to sign unsigned draw file 314. In accordance with conventional techniques, public key 310 can later be used to prove that draw file 208 was in fact signed using private key 308.

For purposes of verification, public key 310 can be read as needed from key memory 306 through draw interface 300. However, because draw interface 300 does not provide access to private key 308 and because only signature generator 304 can read private key 308, the value of private key 308 is kept secret. Thus, proving that draw file 208 was signed using private key 308 proves that only draw server 102 could have generated draw file 208 and draw file 208 is therefore authentic.

In a particular embodiment, signature generator 304 generates a new private key 308 and a new public key 310 periodically. In this embodiment, draw module 202 stores old public keys 310 with draw file 208 in the entry audit log 212. This feature enhances security of gaming system 100 by ensuring that private key 308 remains secret. Tamperproof casing 311 may enclose draw module 202.

Tamperproof casing 311 can detect if tamperproof casing 311 is opened and can then erase the contents of key memory 306 or otherwise disable draw module 202. This adds additional security to gaming system 100 by preventing an individual from directly connecting external devices to key memory 306 to read private key 308 or from altering the operation of the components of draw module 202.

Draw module 202 may include anti-tampering device 309. Anti-tampering device 309 is capable of detecting or preventing unauthorized operation or alteration of draw module 202 and may represent a single component or multiple components. Anti-tampering device 309 may be designed to prevent one or more potential types of tampering including, but not limited to, electronic, magnetic, or physical tampering. Anti-tampering device 309 may include heat, pressure, photoelectric, or magnetic sensors; surge protectors; a tampering log to record suspicious changes in the physical environment; or any other device suitable to detect, prevent, expose, or record unauthorized operation or alteration of draw module 202. Anti-tampering device 309 may thwart unauthorized operation or alteration of draw module 202 or alleviate the impact of such activity by disabling all or any portion of draw module 202, by documenting the activity in a permanent log, by notifying game sponsor 150, or by any other suitable means.

In a particular embodiment, draw server 102 comprises an IBM "4758" PCI Cryptographic Coprocessor. The "4758" includes anti-tampering devices 309 that can detect temperature changes and X-ray exposure that might affect the circuitry of the "4758". The anti-tampering devices 309 in the "4758" prevent such attempts to alter the circuitry by erasing the private key 308 and public key 310 stored in key memory 306.

Figure 5A:
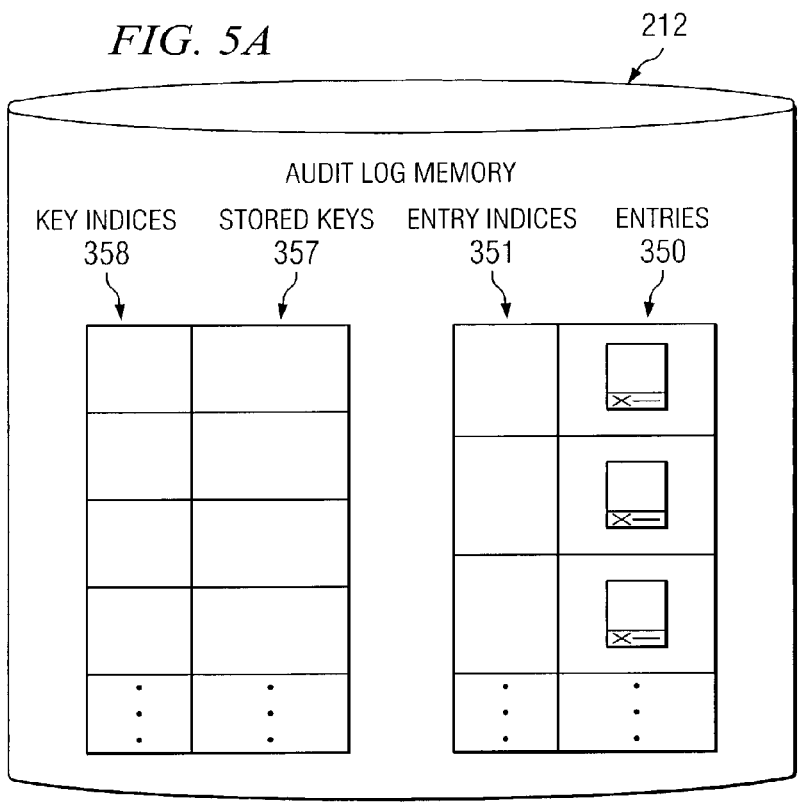
FIG. 5A is a diagram illustrating details about the operation of an audit log memory.

FIG. 5A illustrates further details of audit log memory 212 and operation of audit log memory 212 during authentication of a winning claim. FIG. 5 relates to an embodiment in which game operator 160 possesses and operates both draw server 102 and client server 104. In this embodiment, game sponsor 150 is responsible for reimbursing game operator 160 for any prizes disbursed for winning results and, as a result, game sponsor 150 authenticates any claim by game operator 160 that a winning result has occurred.

Audit log memory 212 holds entries 350 which document operation of the draw server 102 on a draw-by-draw basis. Each entry 350 includes a draw file 208 from a draw conducted by draw server 102. An entry index 351 is associated with each entry 350 to identify the particular game for which draw server 102 generated the included draw file 208. Entry index 351 may represent game identifier 178 from draw request 206 or any other information that can uniquely identify a game that received random numeric outcomes 110 from draw server 102. For gaming systems 100 that include multiple client servers 104, entry index 351 may also include client identifier 176.

Additionally, in this embodiment, audit log memory 212 holds stored keys 357 and associated key indices 358. Stored key 357 represents an expired public key 310 that was in effect during a specified period in the past. A key index 358 indicates the time period over which the associated stored key 357 was in effect.

Figure 5B:
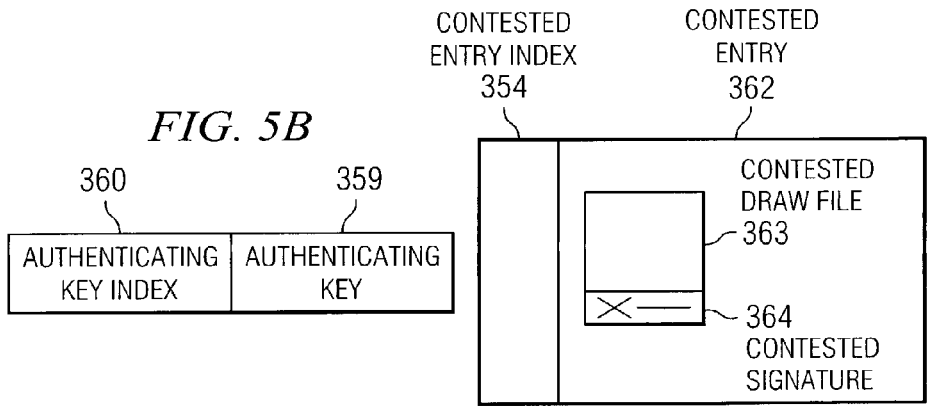
FIG. 5B is a diagram illustrating further details about the operation of an audit log memory.
Figure 5C:
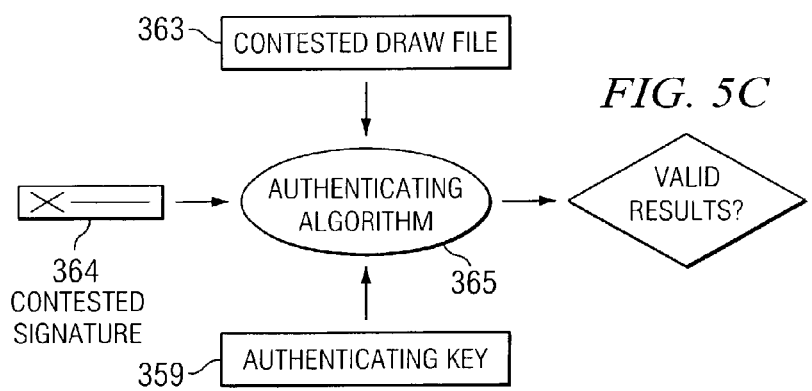
FIG. 5C is a diagram illustrating further details about the operation of an audit log memory.

FIGS. 5B and 5C illustrate operation of audit log memory 212 during authentication of game results. When a winning claim is presented to game sponsor 150 by game operator 160, game sponsor 150 obtains audit log memory 212. Game sponsor 150 verifies that audit log memory 212 contains entries 350 and stored keys 357 for all the draws that have been conducted. If not, audit log memory 212 has been tampered with and any winning results are invalid.

Assuming audit log memory 212 contains a complete history of the operation of draw server 102, game sponsor 150 locates the particular entry index 351 that corresponds to the game that produced the winning claim, a contested entry index 354. Game sponsor 150 accesses the entry 350 associated with contested entry index 354, a contested entry 362. Contested entry 362 represents the results of the contested game and includes a contested draw file 363 containing a contested signature 364.

Similarly, game sponsor 150 locates the particular key index 358 that corresponds to the time period in which draw server 102 generated outcomes for the contested game, an authenticating key index 360. Game sponsor 150 accesses the stored key 357 associated with authenticating key index 358, an authenticating key 359.

FIG. 5C illustrates authentication of the contested draw file 363. Game sponsor 150 verifies that contested draw file 363 was in fact created by draw server 102 and has been unaltered since creation. More specifically, game sponsor 150 verifies that authenticating key 359 is the public key 310 associated with the private key 308 used to sign contested draw file 363 and that contested draw file 363 has not been altered since contested signature 364 was applied. This is done using conventional digital-signature techniques in which game sponsor 150 uses authenticating key 359, contested signature 364 and contested draw file 363 as inputs to an authenticating algorithm 365. Authenticating algorithm 365 generates an affirmative response if draw server 102 generated contested draw file 363 and contested draw file 363 has been unchanged since being signed.

Once game sponsor 150 has proven that contested draw file 363 is in fact valid, game sponsor 150 verifies that contested draw file 363 produced a winning result. Specifically, game sponsor 150 applies random numeric outcomes 110 contained in contested draw file 363 to game and state information provided by commit data 174 in contested draw file 363. For example, if contested draw file 363 corresponded to a draw for a bingo game, game sponsor 150 verifies that random numeric outcomes 110 would produce a "bingo" based on the cards in play and the algorithm used for generating bingo balls from random numeric outcomes 110 as specified in commit data 174.

Figure 6:
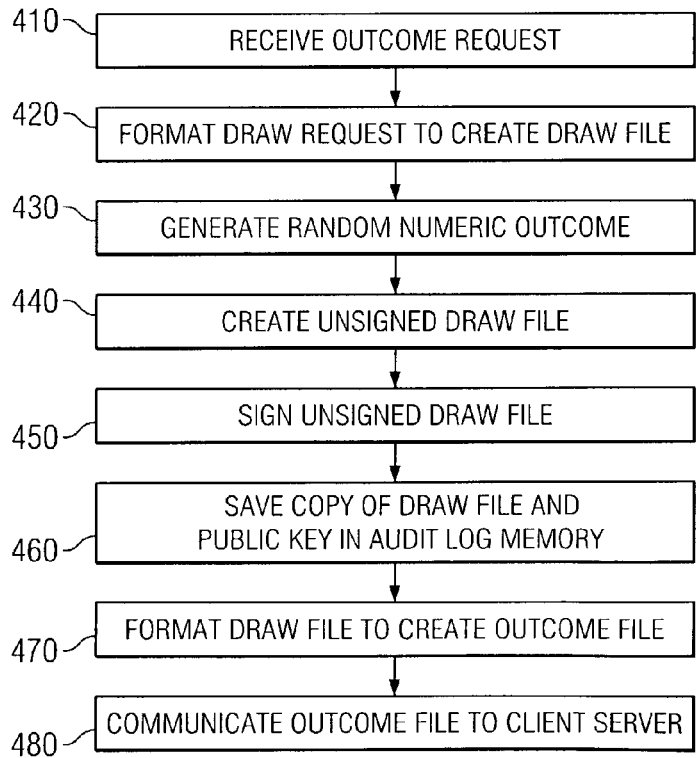
FIG. 6 is a flowchart illustrating the operation of a draw server in one embodiment of the present invention.

FIG. 6 is a flow chart illustrating the steps of generating a draw for a game of keno in one embodiment of the present invention. At step 410, draw server 102 receives from client server 104 an outcome request 106 containing draw type indicator 170, draw parameters 172, and commit data 174. Commit data 174 includes information indicating the numbers that currently have bets. Draw server 102 formats outcome request 106 to create draw request 206 at step 420.

Using draw request 206, draw server 102 generates one or more random numeric outcomes 110 based on draw type indicator 170 and draw parameters 172 at step 430. At step 440, draw server 102 creates unsigned draw file 314 that includes the random numeric outcomes 110 and commit data 174. The draw server 102 digitally signs unsigned draw file 314 using private key 308 at step 450 creating draw file 208 with digital signature 312. Draw server 102 saves a copy of the draw file 208 to audit log memory 212 at step 460.

Draw server formats draw file 208 to create outcome file 108 at step 470. At step 480, draw server 102 communicates outcome file 108 to client server 104 for use in determining the winner of a game.

Figure 7:
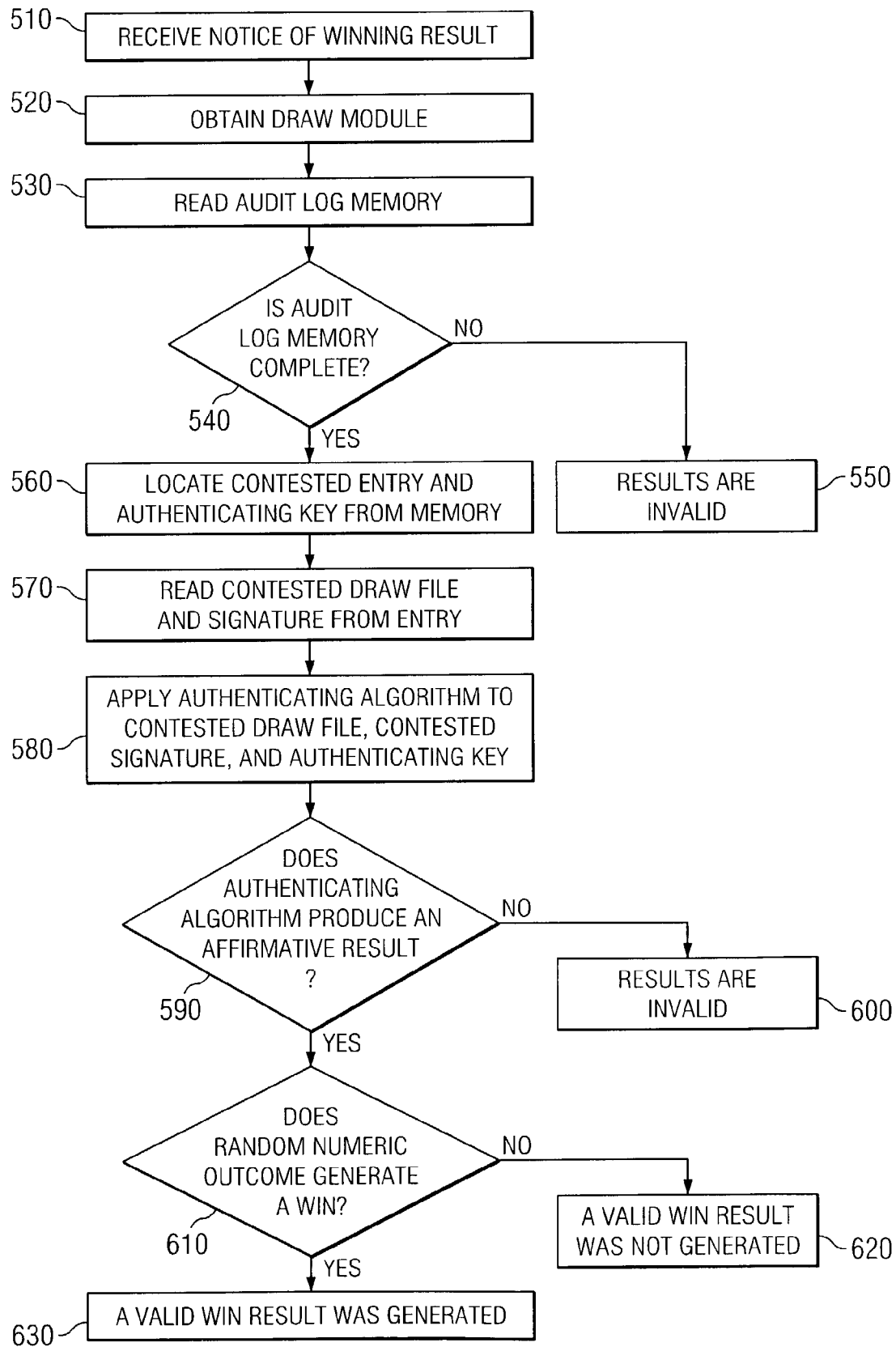
FIG. 7 is a flowchart illustrating authentication of the results of a game.

FIG. 7 is a flowchart illustrating the steps for authenticating the results of a keno game under a particular embodiment of the present invention. FIG. 7 relates to one embodiment of the present invention in which a game operator 160 possesses and operates both client server 104 and draw server 102.

In step 510, game sponsor 150 receives notice from game operator 160 that a winning result has occurred in the keno game. Game sponsor 150 obtains draw module 202 of draw server 102 in step 520.

Game sponsor 150 reads audit log memory 212 of the draw module 202 in step 530. In step 540, game sponsor 150 verifies that the audit log memory 212 includes entries 350 for all the draws draw server 102 has conducted. If not, the audit log memory 212 has been tampered with and the results are invalid at step 550.

If audit log memory 212 does have all the entries 350, game sponsor 150 locates entry index 351 that matches game identifier 178 of the game which allegedly generated a win, contested entry index 354. Similarly, game sponsor 150 locates key index 358 that corresponds to the time period in which draw server 102 generated random numeric outcomes 110 for the contested game, authenticating key index 358. Using contested entry index 354 and authenticating key index 358, game sponsor 150 accesses, at step 560, contested entry 362 and authenticating key 359. In step 570, game sponsor 150 reads from the contested entry 362 a contested draw file 363 with contested signature 364.

Utilizing conventional digital signature techniques, game sponsor 150 verifies in steps 580-600 that contested signature 364 was generated with a private key 308 associated with authenticating key 359. In step 580, game sponsor 150 applies authenticating algorithm 365 to contested draw file 363, contested signature 364, and authenticating key 359 to verify that draw server 102 generated contested draw file 363 and that contested draw file 363 has been unchanged since being signed. If both conditions are satisfied, at step 590, authenticating algorithm 365 produces an affirmative response and the results are valid. However, if either condition is not satisfied, authenticating algorithm 365 does not produce an affirmative response and the results are invalid at step 600.

If the results are valid, then at step 610 game sponsor 150 determines whether contested draw file 363 would have created a winning result based on random numeric outcomes 110 and commit data 174 of contested draw file 363. Authentication results are shown at steps 620 and 630.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing numeric outcomes to a game operator, comprising:
   receiving a draw request that includes commit data that defines conditions under which random numeric outcomes to be generated will result in a win for a player of a game;
   generating, with an electronic processor, a random numeric outcome based on the draw request;
   communicating the random numeric outcome to a game operator to be used by the game operator to determine whether a win has occurred in the game;
   generating a draw file that includes the random numeric outcome and the commit data;
   digitally signing the draw file with a digital signature using a private key;
   storing the draw file in an audit log in an electronic memory;
   after storing the draw file, retrieving the draw file from the audit log;
   verifying that the draw file has not been changed since being stored, wherein verifying that the draw file has not been changed since being stored comprises:
      retrieving a public key associated with the private key used to sign the draw file, wherein the public key indicates that the digital signature for the draw file was generated using the associated private key; and
      verifying, based on the public key, that the draw file has not been changed since being signed using the private key; and
   confirming, based on information in the draw file, that the random numeric outcome resulted in a game win.

2. The method of claim 1, wherein digitally signing the draw file comprises digitally signing the draw file with a private key associated with a current time, and wherein retrieving the public key comprises:
   determining a time associated with the draw file; and
   retrieving a public key associated with the determined time.

3. The method of claim 1, wherein storing the draw file in an audit log comprises storing the draw file in an audit log that includes a plurality of draw files indexed by time.

4. The method of claim 1, wherein receiving a draw request further comprises receiving a draw request that includes game parameters, wherein the game parameters describe parameters for one or more random numeric outcomes to be generated.

5. The method of claim 1, wherein retrieving the draw file comprises:
   receiving an indication that a random numeric outcome included in the draw file resulted in a game win; and
   in response to receiving the indication, retrieving the draw file from the audit log.

6. A system for providing numeric outcomes to a game operator, comprising:
   an interface module operable to receive a draw request that includes commit data defining conditions under which random numeric outcomes to be generated will result in a win for a player of a game from a remote element and transmit one or more random numeric outcomes to the remote element;

a random number generator operable to:
  generate the one or more random numeric outcomes based on the draw request; and
  generate a draw file that includes the random numeric outcome and the commit data;

a digital signature generator operable to:
  generate a digital signature for the draw file using a private key;
  store the signed draw file in an audit log memory;
  after storing the draw file, retrieve the draw file from the audit log memory; and
  verify that the draw file has not been changed since being stored;

a key memory operable to store a public key associated with the private key, wherein the public key indicates that the digital signature generator generated the digital signature for the draw file using the associated private key; and the audit log memory operable to store an audit log comprising a plurality of signed draw files, wherein each of the signed draw files includes sufficient information to allow an operator of the system to confirm that the one or more random numeric outcomes included in that draw file resulted in a game win.

7. The system of claim 6, wherein:
the digital signature generator is operable to generate a digital signature for the draw file using a private key associated with a current time; and
the key memory is operable to store a plurality of public keys and a plurality of private keys, wherein the public keys are indexed by time and each public key is associated with one of the private keys.

8. The system of claim 6, wherein the audit log comprises a plurality of draw files indexed by time.

9. The system of claim 6, wherein the interface module is operable to receive a draw request by receiving a draw request that includes game parameters and commit data, wherein the game parameters describe parameters for one or more random numeric outcomes to be generated.

* * * * *